United States Patent [19]

Hendricks et al.

[11] 4,316,256
[45] Feb. 16, 1982

[54] THERMOSTAT WITH AUTOMATIC HEAT/AIR CONDITIONING CHANGEOVER

[75] Inventors: Donald B. Hendricks, Bloomington; Robert M. Knight, Greenwood, both of Minn.

[73] Assignee: MicroComm Corporation, Minneapolis, Minn.

[21] Appl. No.: 108,340

[22] Filed: Dec. 31, 1979

[51] Int. Cl.³ .......................... F23N 5/20; H05B 1/02
[52] U.S. Cl. .................... 364/505; 364/557; 364/418; 364/143; 236/46 R
[58] Field of Search ............ 364/505, 557, 104, 418, 364/107; 236/46 R, 78 A

[56] References Cited

U.S. PATENT DOCUMENTS

| | | | |
|---|---|---|---|
| 3,555,251 | 1/1971 | Shavit | 364/505 |
| 3,912,913 | 10/1975 | Bunting | 236/46 X |
| 4,001,557 | 1/1977 | Stephenson | 236/46 R X |
| 4,004,138 | 1/1977 | Morooka et al. | 364/118 |
| 4,071,745 | 1/1978 | Hall | 364/104 |
| 4,079,366 | 3/1978 | Wong | 340/409 X |
| 4,109,704 | 8/1978 | Spethmann | 364/505 X |
| 4,110,632 | 8/1978 | Wyland | 236/46 R X |
| 4,114,807 | 9/1978 | Naseck et al. | 364/418 X |
| 4,122,893 | 10/1978 | Thompson | 364/505 X |
| 4,136,392 | 1/1979 | Westphal et al. | 364/557 X |
| 4,162,036 | 7/1979 | Balduzzi et al. | 236/46 R X |
| 4,191,328 | 3/1980 | Issacs et al. | 236/46 R |
| 4,206,872 | 6/1980 | Levine | 165/12 X |
| 4,215,408 | 7/1980 | Games et al. | 364/505 |

*Primary Examiner*—Edward J. Wise
*Attorney, Agent, or Firm*—Kinney, Lange, Braddock, Westman and Fairbairn

[57] ABSTRACT

A microcomputer controlled digital thermostat has separate, independent registers for storing heating control information and cooling control information. On a periodic basis, the microcomputer determines whether the furnace should be turned on, based upon a temperature signal indicative of room temperature, a time-of-day value indicative of the present time of day, and the stored heating control information. If the furnace is already off and the microcomputer determines that it should remain off, the microcomputer then determines whether air conditioning is needed, based upon the temperature signal, the time-of-day value, and the stored cooling control information.

21 Claims, 2 Drawing Figures

THERMOSTAT WITH AUTOMATIC HEAT/AIR CONDITIONING CHANGEOVER

REFERENCE TO CO-PENDING APPLICATION

Reference is hereby made to our co-pending patent application entitled "Digital Thermostat" which was filed on even date with this application, and which is assigned to the same assignee as the present application.

BACKGROUND OF THE INVENTION

1. Field of the Invention

The present invention relates to temperature control apparatus. In particular, the present invention relates to a thermostat which automatically provides changeover between heating and cooling.

2. Description of the Prior Art

With the dramatic increase in energy costs in recent years, and the growing concern over the availability of fuels, increased attention has been focused upon energy conservation. The reduction of energy consumption in home heating has been a topic of widespread interest.

Significant energy saving in home heating can be achieved by the use of temperature setback at one or more periods during each day. For example, by decreasing the control temperature setting of a thermostat during sleeping hours and during times of day when no one is at home, significant energy savings can be achieved. Clock thermostats which provide at least one setback period have been available for many years. Until recently, these clock thermostats have generally been of a mechanical or electromechanical type.

With the recent development of microprocessors and microcomputers, computerized thermostats which automatically provide two or more setback and setup temperature periods have been developed. Among manufacturers of computerized thermostats are Autotronics, Inc., Control Pak Corporation, Honeywell, Inc., Micro Display Systems, Inc., PSG Industries, Inc., RapidCircuit Corp., and Texas Instruments. A description of computerized thermostats available from these manufacturers may be found in *Popular Science*, "Computerized thermostats program your comfort and save on energy costs", pages 104–106 (October 1979).

Other digital thermostats or process control apparatus are disclosed in the following U.S. patents:
Bunting: No. 3,912,913
Stephenson: No 4,001,557
Marooka et al: No. 4,004,138
Hall: No. 4,071,745
Wong: No. 4,079,366
Wyland: No. 4,110,632
Balduzzi et al: 4,162,036

In Bunting Pat. No. 3,912,913, a process control apparatus is disclosed which includes a digital computer. Digital temperature values from a temperature register are compared with values from a temperature sensor. A program which may be coded on a punch card or tape is read by a program reader and is used to control the arithmetic unit and provide selection of the proper temperature from the temperature register at the appropriate times.

The Stephenson Pat. No. 4,001,557 shows a digital process controller having a timing clock which is used in conjunction with programmable read only memories. A specific embodiment shown by Stephenson shows temperature being varied as a function of time, together with auxiliary control of a vacuum pump and a gas pump.

In the Marooka et al Pat. No. 4,004,138, a temperature control for a steel furnace is shown. The control utilizes various arithmetic units and a temperature decision unit to control temperatures in various zones of the steel furnace.

The Hall Pat. No. 4,071,745 shows a microprocessor controlled electronic thermostat. The values of the reference temperatures and times are programmable and changeable by the user. In addition, hysteresis and anticipation values are stored. Zone control of multiple zones is also illustrated in the Hall patent.

The Wong Pat. No. 4,079,366 shows a digital thermostat which includes digital memories, a keyboard and a display. The user may program in any desired temperature and time. Hysteresis is adjustable in the digital thermostat of the Wong patent. In addition, day off selectors are provided so that weekends can have a different time/temperature program.

The Wyland Pat. No. 4,110,632 shows a device which monitors indoor and outdoor temperatures together with a time count from a seven-day counter. The purpose of the device is to disconnect selective loads when conditions of peak electrical use are likely to occur.

The Balduzzi et al Pat. No. 4,162,036 shows a solid state thermostat having a pair of potentiometers $R_d$ and $R_v$ controlled by knobs 13 and 14 to provide set points for high and low temperatures. One or the other of these two potentiometers is switched into a bridge by switches S1 and S2. These switches are controlled by flipflop FF4, which in turn is controlled by Clock 1 and Clock 2. When one of the clock settings is reached, it triggers FF4 which in turn selects the appropriate switch S1 or S2.

Although there has been considerable recent activity in the development of digital computerized thermostats, there is a continuing need for improvement. One shortcoming of both the prior art electro-mechanical thermostats and the more recently developed digital computerized thermostats is that the changeover from heating to air conditioning and vice versa is performed manually by a control switch or the like. This is inconvenient particularly in those climates having hot days and cool nights, where air conditioning is required during the daylight hours and heating is required at night.

In addition, in the prior art digital computerized thermostats, the air conditioning program has typically not been independent of the heat program. As a result, when the user manually switches from a heat program to an air conditioning program, re-programming of the thermostat has been required and/or the heat program has been lost. Similar problems occur each time a changeover is made back from the air conditioning program to the heat program.

SUMMARY OF THE INVENTION

The present invention is an improved temperature control apparatus which provides automatic changeover between heating and cooling, so that the control apparatus controls both heating apparatus (e.g. a furnace) and cooling apparatus (e.g. air conditioning) without requiring a manual switching or reprogramming of heating or cooling control information.

The temperature control apparatus of the present invention includes means for storing heating control information for use in controlling the heating apparatus and means for storing cooling control information for use in controlling the cooling apparatus. Temperature sensing means provide a temperature signal indicative to a sensed temperature, and time-of-day means provide a time-of-day value.

Control means provide heating and cooling control signals for controlling the heating apparatus and the cooling apparatus, respectively. The control means periodically makes a heating control determination based upon the time-of-day value, the temperature signal, and the stored heating control information. As a result of the heating control determination, the control means provides a heating control signal which (a) turns the heating apparatus on; (b) turns the heating apparatus off; (c) leaves the heating apparatus on; or (d) leaves the heating apparatus off. If the control means has made a heating control determination to leave the heating apparatus off, the control means then makes a cooling control determination based upon the time-of-day value, the temperature signal, and the cooling control information. As a result of the cooling control determination, the control means provides a cooling control signal which (e) turns the cooling apparatus on; (f) turns the cooling apparatus off; (g) leaves the cooling apparatus on; or (h) leaves the cooling apparatus off.

DETAILED DESCRIPTION OF THE PREFERRED EMBODIMENTS

Figure 1:
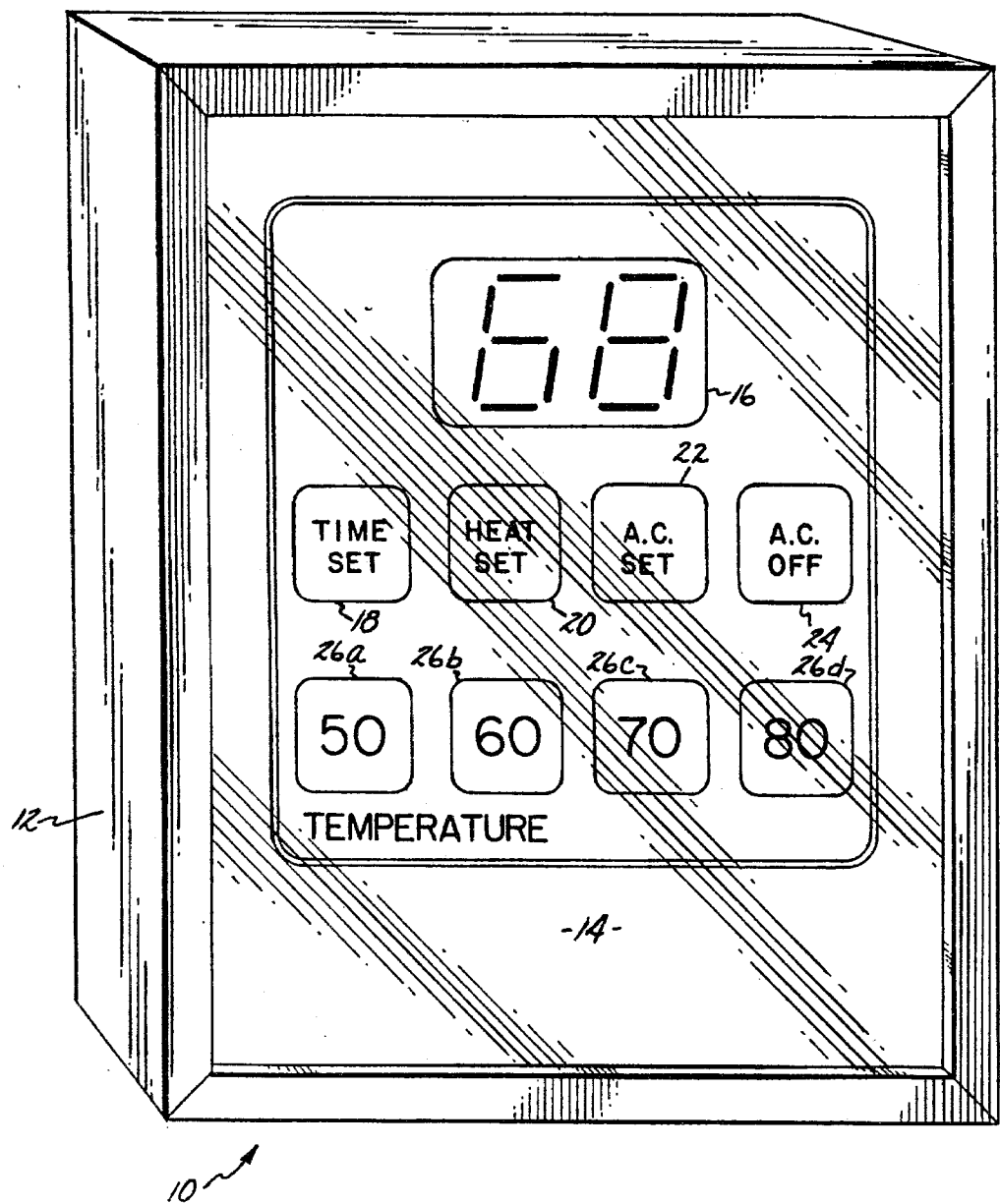
FIG. 1 is a perspective view of the programmable electronic thermostat of the present invention.

In FIG. 1, thermostat 10 of the present invention includes generally rectangular housing 12 which is typically mounted on a wall within the house or building whose temperature is being controlled by thermostat 10. Front face plate 14 of thermostat 10 includes a two-digit display 16 and a plurality of membrane switches or keys including TIME SET key 18, HEAT SET key 20, AC SET key 22, AC OFF key 24, and TEMPERATURE "50", "60", "70" and "80" keys 26a, 26b, 26c and 26d, respectively.

The membrane switches are used to both program the thermostat (i.e. enter and store time and temperature settings) and for program recall, so that the user can view, through display 16, the stored time/temperature settings.

Figure 2:
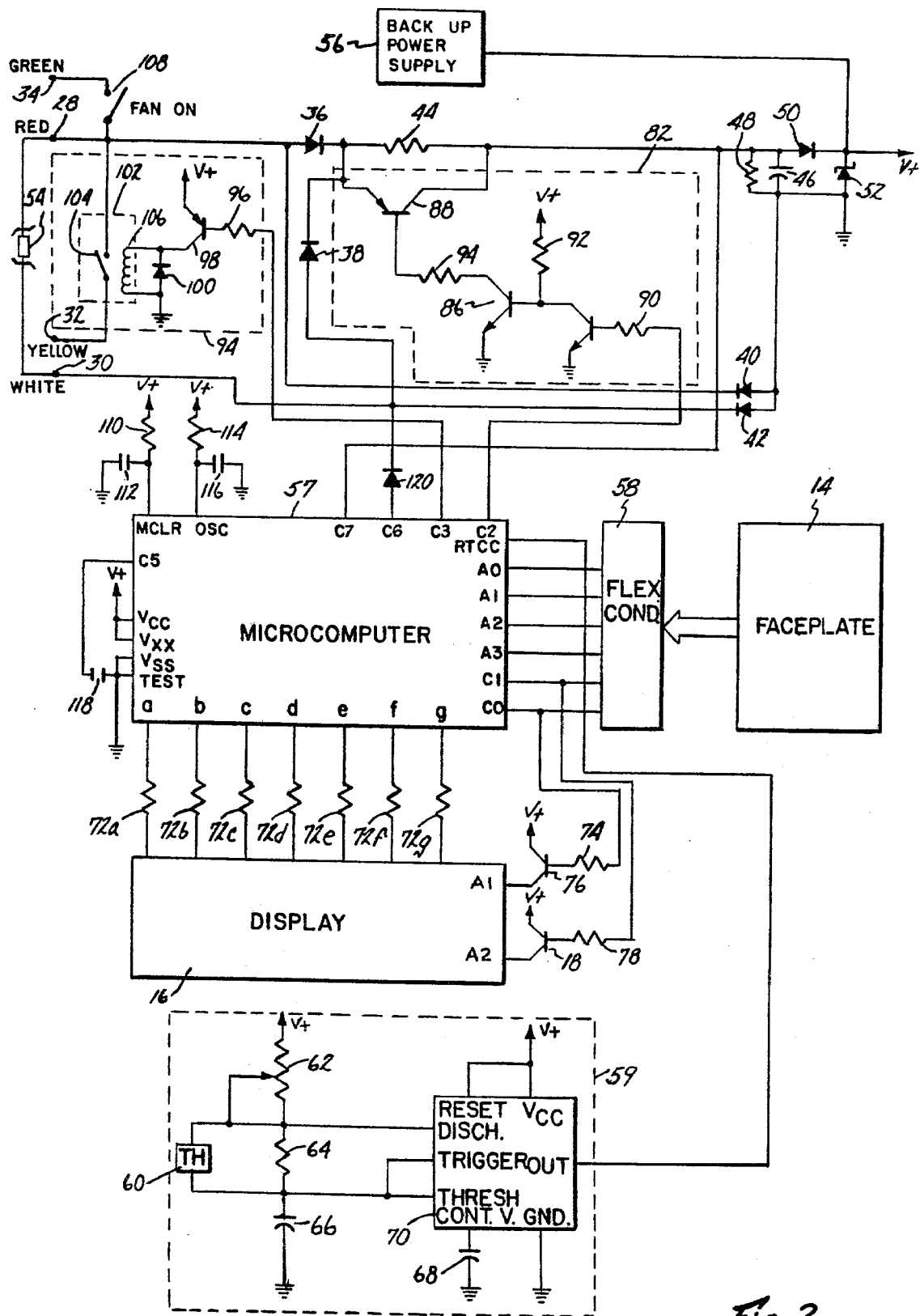
FIG. 2 is an electrical schematic diagram of the programmable electronic thermostat of the present invention.

FIG. 2 is a schematic diagram of a preferred embodiment of the thermostat of the present invention. The circuitry shown in FIG. 2 is mounted within housing 12 of FIG. 1. As shown in FIG. 2, the thermostat is capable of controlling a furnace, an air conditioning system, and a blower fan.

Terminals 28 and 30 are connected in series with the valve relay or fan furnace relay of the furnace. In the embodiment shown in FIG. 2, terminal 28 is color coded RED, and terminal 30 is color coded WHITE. Power for the thermostat, in the form of 24 volt AC electrical power from the furnace electrical system is derived from terminals 28 and 30.

Terminal 32, which is color coded YELLOW, is connected to the air conditioning system. Terminal 34, which is color coded GREEN, is connected to the blower fan control. Terminals 32 and 34 are used when the house or building also has a central air conditioning system.

The input power from terminals 28 and 30 is rectified and filtered by a full wave rectifier bridge power supply circuit including diodes 36, 38, 40 and 42, current limiting resistor 44, filter capacitor 46, bleedback resistor 48, diode 50, and Zener diode 52. The voltage V+ necessary for operation of the electronic circuitry of thermostat 10 is established between the cathode and anode of Zener diode 48. In a preferred embodiment of the present invention, voltage V+ is approximately 5 volts. Because the current required to operate the thermostat is very low (on the order of a few milliamperes), the furnace valve relay connected in series with terminals 28 and 30 is not actuated.

Connected between terminals 28 and 30 is metal oxide varistor (MOV) 54. The purpose of MOV 54 is to suppress spikes due to relay turn on and other electrical noise.

The thermostat of FIG. 2 also includes backup power supply 56 in the event of loss of input power at terminals 28 and 30. In one preferred embodiment, backup power supply 56 includes a battery.

Operation of the thermostat is controlled by microcomputer 57. As shown in FIG. 2, microcomputer 57 includes $V_{CC}$ and $V_{XX}$ terminals (which are connected to the power supply voltage V+); terminals $V_{SS}$ and TEST (which are connected to ground); an $\overline{MCLR}$ input, an OSC input, an RTCC inputt, and ports A0–A3, C0–C3, C5–C7 and a–g.

Microcomputer 57 receives input signals from the face plate switches 18, 20, 22, 24 and 26a–26d of face plate 14 through flexible conductor 58 and ports A0–A3. Microcomputer 57 multiplexes the eight switches of face plate 14 by means of signals from ports C0 and C1.

Microcomputer 57 also receives a temperature signal from temperature sensing circuit 59. The temperature signal, which is supplied to the RTCC input of microcomputer 57, has a frequency which is a function of sensed temperature.

In the embodiment shown in FIG. 2, temperature sensing circuit 59 includes thermistor 60, potentiometer 62, resistor 64, capacitors 66 and 68 and timer 70. Thermistor 60 is exposed to the room environment through a hole (not shown in FIG. 1) in housing 12. The resistance of thermistor 60 varies as a function of sensed temperature.

In the preferred embodiments shown in FIG. 2, timer 70 is a 555 type integrated circuit timer. The output of timer 70 is a temperature signal which is supplied to the RTCC input of microcomputer 57. As the temperature increases, the temperature signal from timer 70 increases. Conversely, as room temperature decreases, the frequency of the signal decreases. Microcomputer 56 counts the pulses of the temperature signal from timer 70 and thereby converts the frequency of the temperature signal to a digital temperature value.

Based upon signals received from the switches or keys of face plate 14 and the output signal of timer 70, microcomputer 57 controls display 16 through ports a–g and resistors 72a–72g. Display 16 is multiplexed by microcomputer 57 by signals supplied to the A1 and A2 inputs of display 16. The A1 input is controlled by the C0 port of microcomputer 57 through resistor 74 and transistor 76. Similarly, the A2 input of display 16 is controlled by microcomputer 57 through port C1, resistor 78, and transistor 80.

Microcomputer 57 controls current flow between terminals 28 and 30, and therefore the furnace valve relay, by means of heat control circuit 82 connected to port C2 of microcomputer 57. As shown in FIG. 2, heat control circuit 82 includes transistors 84, 86 and 88, and resistors 90, 92 and 94. Transistor 88 has its emitter-collector current path connected in parallel with current limiting resistor 44. In normal operation, transistor 88 is turned off, so that all current flow passes through current limiting resistor 44. When transistor 88 is turned on, on the other hand, a large current flow is permitted, which is sufficient to actuate the furnace valve relay.

Current flow between the RED terminal 28 and YELLOW terminal 32, and therefore operation of the air conditioning system, is controlled by microcomputer 57 through AC control circuit 94 connected to port C3. AC control circuit 94 includes resistor 96, transistor 98, diode 100, and reed switch 102. Normally open contacts 104 of reed switch 102 are connected between terminals 28 and 32. When current flows through coil 106 of reed switch 102, contacts 104 are closed, thereby closing the circuit between terminals 28 and 32, and actuating the air conditioning system.

As shown in FIG. 2, current flow between GREEN terminal 34 and RED terminal 28 is controlled by a normally open FAN ON switch 108. When switch 108 is closed, current flow between terminals 28 and 34 is permitted, thereby causing constant operation of a blower fan. Switch 108, which is not shown in FIG. 1, is preferably located on the lower portion of housing 12 and is controllable by the user.

Resistor 110 and capacitor 112 are connected to the $\overline{\text{MCLR}}$ input of microcomputer 57. Upon initial power up of the thermostat, the signal at the $\overline{\text{MCLR}}$ input causes microcomputer 57 to initialize the various registers containing temperature and time settings and to cause display 16 to display a flashing "00" indicating power up conditions to the user.

Connected to the OSC input of microcomputer 57 are resistor 114 and capacitor 116. The values of resistor 114 and capacitor 116 determine the frequency of internal clock signals used by mirocomputer 57.

Contacts 118 are connected between port C5 of microcomputer 57 and ground. When the thermostat is intended for use with 60 Hz power, contacts 118 are open, and the port C5 is not grounded. When, on the other hand, 50 Hz input power is to be used, contacts 118 are soldered closed. In this manner, the same thermostat circuit can be used for both 50 Hz and 60 Hz applications, with one minor alteration in the factory or in the field.

Port C6 of microcomputer 57 is connected to WHITE terminal 30 through diode 120. The signal at port C6 is a half wave rectified AC signal which is used by microcomputer 57 to keep track of the time of day. By counting cycles of the signal at port C6 and knowing whether the input power is 50 or 60 Hz (by monitoring port C5), microcomputer 57 maintains time of day for use in its control function.

Port C7 is connected to the anode of diode 50 (and one terminal of filter capacitor 46). The signal at port C7, therefore, indicates whether AC power is present between terminals 28 and 30. As long as AC power is present, filter capacitor 46 is charged and the signal at port C7 is high. In the event of a loss of AC input power, filter capacitor 46 discharges and the signal at port C7 goes low. Diode 50 prevents current from backup power supply 56 from recharging filter capacitor 46 in the event of a loss of AC power, while permitting backup power supply 56 to supply voltage V+ necessary to maintain microcomputer 57 in operation.

In the event of loss of AC power, microcomputer 57 turns off heat control circuit 82 and AC control circuit 94, thereby minimizing the current draw from backup power supply 56. The current draw from backup power supply 56 when AC power is lost is relatively low—only that which is required to preserve the contents of the memories within microcomputer 57.

During normal operation, microcomputer 57 controls operation of the furnace as a function of the time of day, the stored time/temperature settings (which were entered through the switches of face plate 14) and the temperature signal supplied by temperature sensing circuit 59. In a preferred embodiment of the present invention, up to four different time and temperature settings may be entered and stored within microcomputer 57.

In the case of air conditioning, a turn on time, a turn off time and a desired temperature are stored. Control of air conditioning is between the turn-on time and the turn-off time. The stored times and temperatures for air conditioning are independent of the stored time/temperature settings for heating.

The present invention provides entry and recall of time and temperature settings by means of switches 18, 20, 22, 24 and 26a-26d, together with display 16. The number of switches or keys required to enter and recall settings is limited to only eight keys, thereby reducing cost of the thermostat of the present invention and simplifying entry and recall.

As discussed previously, when thermostat 10 is turned on (after installation and after each loss of voltage V+), the $\overline{\text{MCLR}}$ signal causes microcomputer 57 to initialize all temperature and time setting registers and to cause a flashing "00" to be displayed on display 16. This indicates to the user that thermostat 10 is in a power up phase after a loss of power.

The first operation which must be performed by the user is to enter the time of day (to the nearest hour) into a time-of-day register designated "HO" (for "hour"). The user contacts the TIME SET key 18, holds key 18 for a time in excess of six seconds. Microcomputer 57 requires that TIME SET key 18 (and any of the other keys) be maintained for greater than six seconds in an ON state in order to make a change in stored values within the memory of microcomputer 57.

In order to enter and store the time of day, the user presses and holds TIME SET key 18 in an ON condition until "HO" is displayed on display 16. As key 18 continues to be held ON, the time of day appears and begins to increase incrementally from "1" (for 1 a.m.) toward "24" for (12 p.m.) until the operator releases TIME SET key 18. Whatever hour (from "1" through "24") which is displayed on display 16 at the moment that TIME SET key 18 is stored in a time of day register by microcomputer 57. Thereafter, microcomputer 57 updates the time of day register based upon the AC input received at port C6 and based upon whether the AC input is 50 or 60 cycles, as indicated by port C5.

In the present invention, the time of day is maintained only to the nearest hour. This is sufficient accuracy for controlling temperatures in a home or building, and permits the use of a two-digit display, rather than requiring four digits.

In order to recall and view the time of day, the user simply presses and then releases TIME SET key 18. As long as the time which key 18 is held is less than 3 seconds, microcomputer 57 causes the letters "HO" to appear on display 16. Microcomputer 57 then causes the time of day to appear on display 16.

Once the time of day has been stored, microcomputer 57 causes display 16 to display room temperature, as sensed by thermistor 94. Room temperature continues to be displayed except when a key has been pressed to enter or recall settings. This differs from the prior art digital clock thermostats, which normally display time of day. This feature of the present invention is particularly advantageous, since it is room temperature and not the time of day which is of foremost concern of the user when checking the thermostat. It is inconvenient to have to press a key or switch in order to determine room temperature, as in the prior art devices.

After the user has set the time of day, the next operation to be performed is to set the time/temperature registers for controlling heating. In a preferred embodiment of the present invention, a total of four different registers, designated H1–H4, are provided for storing up to four different time/temperature settings. The user enters the desired settings into registers H1–H4 by means of HEAT SET key 20 and TEMPERATURE keys 26a–26d.

To set the first time/temperature register H1, the user presses and holds HEAT SET key 20. Microcomputer 57 causes display 16 to display "H1". Three seconds later, if the user is still holding HEAT SET key 20, a time will begin to be displayed on display 16. Assuming that H1 has not been previously set, the time displayed is initially "00". As the user continues to hold HEAT SET key 20 for three more seconds, the displayed time will begin to increment from "00" upward toward "24". When the user releases HEAT SET key 20, the time displayed on display 16 at the instant when HEAT SET key 20 was released is stored in register H1.

Upon release of HEAT SET key 20, microcomputer 57 again causes display 16 to display the room temperature. The user then presses and releases HEAT SET key 20, and presses and holds one of the four TEMPERATURE keys 26a–26d. Each of these four keys represents one decade of temperatures in °F. For example, if the user desires a temperature of 68° F. for H1, he presses TEMPERATURE key 26b. This causes display 16 to begin displaying temperatures beginning with "60" and moving incrementally upward to "69" as TEMPERATURE key 26 continues to be held. When the user releases TEMPERATURE key 26b, the temperature then being displayed on display 16 is stored in memory by microcomputer 57 in register H1.

Similar operation is provided by keys 26a, 26c and 26d. In the event the user continues to hold a particular TEMPERATURE key until the highest temperature in the decade has been reached, the displayed temperature returns to the lowest temperature of that decade and again is incremented upward until the user releases the TEMPERATURE key. In other words, each key 26a–26d is limited to its own decade of temperatures, and cannot be used to store a temperature falling within one of the other decades.

Once register H1 has been set, the user proceeds with setting the next register H2. H2 is called up by pressing and releasing HEAT SET key 20 once rapidly, and then pressing and holding HEAT SET key 20 until display 16 displays "H2", followed by the time contained in register H2. As the user continues to hold HEAT SET key 20, the displayed time begins to increment upward.

The user continues to hold HEAT SET key 20 until the desired time appears, and then releases HEAT SET key 20. This causes the last time to be displayed in display 16 to be stored in register H2. Microcomputer 57 then causes display 16 to again display room temperature.

To set the temperature for register H2, the user depresses and releases HEAT SET key 20 twice rapidly, thereby calling up register H2. He then holds the desired TEMPERATURE key 26a, 26b, 26c or 26d and holds that key until the desired temperature appears on display 16. At that point, the user releases the TEMPERATURE key, thereby causing the temperature displayed on display 16 to be stored in register H2.

The storing of time and temperatures in registers H3 and H4 is achieved in a similar fashion. To access register H3 and store a time, HEAT SET key 20 is pressed and released rapidly twice and then held a third time until the desired time of day appears. To store a temperature in register H3, HEAT SET key 20 is pressed and released three times rapidly, and then one of the four TEMPERATURE keys 26a–26d is held until the desired temperature appears.

Similarly, to store a time in register H4, HEAT SET key 20 is pressed and released rapidly three times, and then pressed and held a fourth time until the desired time is displayed on display 16. HEAT SET key 20 is then released, thereby causing the displayed time to be stored in register H4. To store a temperature in register H4, HEAT SET key 20 is pressed and released rapidly four times, and then one of the four TEMPERATURE keys 26a–26d is pressed and held until the desired temperature is displayed. Upon release of the key the displayed temperature is stored in register H4.

The user can review the contents of registers H1 through H4 by pressing and releasing HEAT SET key 20 rapidly. Microcomputer 57 then causes display 16 to display "H1" followed by its time and temperature; "H2" followed by its time and temperature; "H3" followed by its time and temperature; and finally "H4" followed by its time and temperature. Display 16 then returns to displaying room temperature. If the user is not interested in viewing the contents of H1, the contents of H2, H3 and H4 can be reviewed by pressing and releasing HEAT SET key 20 twice rapidly. This will cause "H2", "H3" and "H4" to be displayed, together with their stored times and temperatures. Similarly, only H3 and H4 can be viewed by rapidly pressing and releasing HEAT SET key 20 three times. Finally, if only H4 is to be reviewed, HEAT SET key 20 is rapidly pressed and released four times. A recall of the contents of registers H1 through H4 can be cancelled at any time by touching either key 18, 22 or 24.

Control of air conditioning by thermostat 10 is programmed in a similar manner. With air conditioning, however, only a single turn-on time and temperature may be stored. In addition, a turn-off time for shutdown of the air conditioning system is also stored.

The turn-on time and temperature for air conditioning is stored by pressing and holding AC SET key 22. Microcomputer 57 causes display 16 to first display "AC", followed by the time and temperature then stored in the AC register. As the user continues to hold AC SET key 22, time is displayed on display 16 and begins to incrementally increase until the user releases AC SET key 22. The displayed time at the instant when AC SET key 22 is released is stored in the AC register.

The user then sets a temperature in the AC register by pressing and releasing AC SET key 22, and then pressing and holding the desired TEMPERATURE key 26a, 26b, 26c or 26d. The temperature will be displayed on display 16, and will count upward until the TEMPERATURE key is released. The temperature displayed on display 16 at the instant when the TEMPERATURE key is released is stored in the AC register.

The user then sets a time in the AO register which represents the time at which the air conditioning is to be turned off. The user presses and holds AC OFF key 24, which causes "AO" to be displayed. As AC OFF key 24 continues to be held, time is displayed and begins to increment upward until AC OFF key 24 is released. The displayed time at the instant when AC OFF key 24 is released is stored in the AO register.

The present invention also provides for complete shutdown of the air conditioning system, which is typical during winter months, when air conditioning is not needed. To shut down the air conditioning system, the user performs the same operation used to set a time in the AO register, but continues to hold the AC OFF key 24 until the letters "OF" appear on display 16. The user then releases AC OFF set switch 24, causing microcomputer 57 to maintain the air conditioning system in a continuous "off" state until the contents of the AO register are altered to remove the "OF" shutdown setting.

To review the air conditioning settings, the user rapidly presses and releases the AC SET key 22. As a result, microcomputer 57 causes display 16 to display "AC" followed by the time and temperature stored in the AC register, followed by "AO" and either the time stored in the AO register, or "OF".

An important advantage of the thermostat is the simplificity with which the temperature and time settings are stored and retrieved. A minimum number of keys are used, together with a "slew entry" type of system in which the keys are held until the desired time or temperature setting is displayed. The keys or switches must be held for a certain predetermined time, such as six seconds, before any alteration of the contents of the registers are effected. As a result, an accidental contacting of the keys will not result in accidental alteration of stored time and temperature settings.

Another important advantage is that microcomputer 57 automatically sorts the time settings within the registers H1 through H4. The user may enter times and temperatures in any order, and need not place the earliest time in register H1. This is an important advantage, particularly where the user wishes to add an additional time and temperature (where at least one of the registers had not been previously used), or wishes to alter the time and/or temperature setting stored in one of the registers. Unlike prior art digital clock thermostats, the thermostat of the present invention does not require that the user reprogram all of the temperature and time settings in order to place the times and temperatures in sequential order. Rather, microcomputer 57 automatically sorts the times within registers H1-H4 to place them in sequential order for use in controlling the heating system.

In normal operation, microcomputer 57 causes display 16 to display room temperature, as sensed by thermistor 94. On a periodic basis, which in one preferred embodiment is every minute, microcomputer 57 performs an "update" routine in which it determines whether the furnace should be turned on or off, and whether the air conditioning should be turned on or off.

Unlike prior art digital thermostats, the preferred embodiment of the present invention automatically decides whether to turn on heat or air conditioning, and does not require the user to select heating only or air conditioning only.

When microcomputer 57 begins the update routine, it first determines the room temperature from the room temperature register, and then determines the time of day from the time-of-day register. Microcomputer 57 then compares the time of day from the time-of-day register with the times stored in registers H1, H2, H3 and H4, in order to determine which of the four registers is applicable.

After the proper heat register (H1-H4) has been selected, microcomputer 57 compares the sensed room temperature with the control temperature in the selected heat register. Depending upon this comparison, microcomputer 57 may provide a signal to control circuit 82 to (a) turn on the furnace if it is presently off; (b) turn off the furnace if it is presently on; (c) leave the furnace on; or (d) leave the furnace off. If the furnace is to be turned on, turned off, or left on, microcomputer 57 takes the appropriate action and discontinues the update routine. If, however, the furnace was already off and the decision was made that it should remain off, microcomputer 57 then checks the contents of the AO and AC registers to determine whether air conditioning is appropriate.

If the content of the AO register is "OF", no air conditioning is permitted and microcomputer 57 discontinues the "update" routine. If, on the other hand, the content of the AO register is a number between "00" and "23", microcomputer 57 then checks the time stored in the AC register against the time of day. If this comparison indicates that air conditioning should be on, microcomputer 57 then compares the room temperature to the control temperature stored in register AC and provides the appropriate signal to control circuit 94 to control the air conditioning system. Microcomputer 57 may (e) turn air conditioning on, (f) turn air conditioning off, (g) leave air conditioning on, or (h) leave air conditioning off.

If the time of day does not fall within a time period in which the air conditioning is to be operating, as indicated by the times stored in the AO and AC registers, microcomputer 57 normally will not turn on the air conditioning. If, however, the room temperature exceeds a predetermined level, such as 85° F., and the AO and AC registers indicate that air conditioning is desired during some hours of the day, then microcomputer 57 will provide signals to control circuit 94 in order to operate the air conditioning system to maintain room temperature at 85° F. In this way, room temperature is not permitted to rise to such a high level that the air conditioning would be unable to effectively reduce the room temperature to the desired control temperature during the time period when air conditioning is desired.

The thermostat of the present invention also prevents undue switching back and forth between heating and air conditioning by giving first priority to heating. Microcomputer 57 always checks the contents of registers H1-H4 first, and controls the furnace before any determination of the need for air conditioning is made. In addition, the need for air conditioning is checked by microcomputer 57 only if the furnace is already off and the decision (by comparing the room temperature with the control temperature in one of the heat registers (H1 ∝ H4) is that the furnace should remain off. As a result, a time delay of at least one minute (the period between successive "update" routines) occurs between the turning off of the furnace and the turning on of the air conditioner. If microcomputer 57 turns off the furnace during one update routine, it must wait until the next update routine before it can determine the need for air conditioning.

The thermostat of the present invention, therefore, provides automatic control of both heating and air conditioning and an automatic switch-over between heating and air conditioning without requiring the user to change the position of a switch. This is particularly advantageous in climates where there is wide variation between daytime and nighttime outdoor temperatures. In these climates, it is often necessary to provide air conditioning during the day and heating during the night.

In addition, the information stored in registers H1–H4 is independent of the information stored in registers AO and AC. The programming of heat control information in registers H1–H4 is independent of and does not affect the information in registers AO and AC, and vice versa. When the thermostat automatically switches between heating and air conditioning, the contents of registers H1–H4, AO and AC remain intact. This is unlike the prior art digital thermostats in which switching between heating and air conditioning requires reprogramming and/or results in a loss of the time/temperature program for either heating or air conditioning.

In conclusion, the present invention is an easy-to-use, low cost, digital clock thermostat. Although the present invention has been described with reference to preferred embodiments, workers skilled in the art will recognize that changes may be made in form and detail without departing from the spirit and scope of the invention.

What is claimed is:

1. Temperature control apparatus for providing heating control signals for controlling heating apparatus and cooling control signals for controlling cooling apparatus, the temperature control apparatus comprising:
   temperature sensing means for providing a temperature signal indicative of a sensed temperature;
   time-of-day means for providing a time-of-day value;
   means for storing heating control information including heating time values and associated heating control temperature values;
   means for storing cooling control information; and
   control means for providing the heating control and cooling control signals, wherein the control means periodically makes a heating control determination, based upon the time-of-day value, the temperature signal, and the stored heating control information, to provide a heating control signal which
   (a) turns the heating apparatus on,
   (b) turns the heating apparatus off,
   (c) leaves the heating apparatus on, or
   (d) leaves the heating apparatus off; and wherein only if the heating control determination leaves the heating apparatus off, the control means makes a cooling control determination based upon the time-of-day value, the temperature signal, and the cooling control information, to provide a cooling control signal which
   (e) turns the cooling apparatus on,
   (f) turns the cooling apparatus off,
   (g) leaves the cooling apparatus on, or
   (h) leaves the cooling apparatus off.

2. The apparatus of claim 1 wherein the control means makes its heating control determination by comparing the time-of-day value with the heating time values stored to select a heating control temperature value, and comparing the temperature signal and the selected heating control temperature value.

3. The apparatus of claim 2 wherein the cooling control information includes a turn-off time value indicative of a time when the cooling apparatus is to be turned off.

4. The apparatus of claim 3 wherein the cooling control information includes a turn-on time value indicative of a time when the cooling apparatus becomes operational, and a cooling control temperature value.

5. The apparatus of claim 4 wherein the control means makes a cooling control determination as a function of the turn-off time value, the turn-on time value, the cooling control temperature value, the time-of-day value, and the temperature signal.

6. The apparatus of claim 5 wherein the turn-off time value has a state whch indicates that the cooling apparatus is to remain continuously off.

7. The apparatus of claim 5 wherein the control means will not provide a cooling control signal to turn on the cooling apparatus if the turn-off temperature value indicates that the cooling apparatus is to remain continuously off.

8. The apparatus of claim 5 wherein the control means will provide a cooling signal to turn on the cooling apparatus during a time period when the turn-on and turn-off time values indicate the cooling apparatus is to be off, if the temperature signal indicates a sensed temperature above a predetermined value.

9. Temperature control apparatus for providing heating control signals for controlling heating apparatus and cooling control signals for controlling cooling apparatus, the temperature control apparatus comprising:
   temperature sensing means for providing a temperature signal indicative of a sensed temperature;
   time-of-day means for providing a time-of-day value;
   means for storing heating control information including heating time values and associated heating control temperature values;
   means for storing cooling control information independent of the heating control information; and
   control means for providing the heating control signals and the cooling control signals, wherein the control means periodically makes a heating control determination bsed upon the time-of-day value, the temperature signal, and the heating control information, and makes a cooling control determination only if the heating control determination indicates that operation of the heating apparatus is not required, the cooling control determination being based upon the time-of-day value, the temperature signal, and the cooling control information.

10. The apparatus of claim 9 wherein the control means makes its heating control determination by comparing the time-of-day value with the heating time values stored to select a heating control temperature value, and comparing the temperature signal and the selected heating control temperature value.

11. The apparatus of claim 10 wherein the cooling control information includes a turn-off time value indicative of a time when the cooling apparatus is to be turned off.

12. The apparatus of claim 11 wherein the cooling control information includes a turn-on time value indicative of a time when the cooling apparatus becomes operational, and a cooling control temperature value.

13. The apparatus of claim 12 wherein the control means makes a cooling control determination as a function of the turn-off time value, the turn-on time value, the cooling control temperature value, the time-of-day value, and the temperature signal.

14. The apparatus of claim 13 wherein the turn-off time value has a state which indicates that the cooling apparatus is to remain continuously off.

15. The apparatus of claim 13 wherein the control means will not provide a cooling control signal to turn on the cooling apparatus if the turn-off temperature value indicates that the cooling apparatus is to remain continuously off.

16. The apparatus of claim 13 wherein the control means will provide a cooling signal to turn on the cooling apparatus during a time period when the turn-on and turn-off time values indicate the cooling apparatus is to be off, if the temperature signal indicates a sensed temperature above a predetermined value.

17. A method of providing heating control signals and cooling control signals for controlling heating apparatus and cooling apparatus, the method comprising:
providing a temperature signal indicative of sensed temperature;
storing heating time values and associated heating control temperature values for use in controlling heating;
storing cooling time values and an associated cooling control temperature value for use in controlling cooling independent of the heating time values and associated heating control temperature values;
providing a time-of-day value indicative of time-of-day;
periodically comparing the time-of-day value with stored heating time values to select one of the associated heating control temperature values;
comparing the temperature signal with the selected heating control temperature value to determine an appropriate heat control signal;
determining, only if the temperature signal exceeds the heating control temperature value, whether the cooling apparatus is in operation; and
comparing the temperature signal and the cooling control temperature value, if cooling apparatus is in operation, to determine an appropriate cooling control signal.

18. The method of claim 17 wherein determining whether cooling apparatus is in operation occurs only if the heating apparatus is already turned off, and the temperature signal exceeds the heating control temperature value.

19. The method of claim 17 and further comprising:
storing an indication of whether the cooling apparatus is to be continuously off at all hours during the day.

20. The method of claim 19 wherein determining whether the cooling apparatus is in operation comprises:
determining from the stored indication whether the cooling system is to be continuously off at all hours during the day; and
if the cooling apparatus is to be on during at least a portion of the day, comparing the time-of-day value and the cooling time values to determine whether the cooling apparatus is in operation.

21. The method of claim 20 and further comprising:
providing a cooling control signal to turn on the cooling apparatus if the temperature signal indicates a temperature greater than a predetermined maximum temperature value and if the stored indication indicates that the cooling apparatus is to operate during at least a portion of the day.

* * * * *